United States Patent [19]

Holmes

[11] 4,265,113
[45] May 5, 1981

[54] SLIDING VALVE ASSEMBLY FOR USE IN GAS METERS OR THE LIKE

[75] Inventor: Howard H. Holmes, Sandy Hook, Conn.

[73] Assignee: Textron, Inc., Providence, R.I.

[21] Appl. No.: 37,094

[22] Filed: May 8, 1979

[51] Int. Cl.³ .............................................. G01F 3/20
[52] U.S. Cl. ..................................... 73/266; 251/162; 251/263
[58] Field of Search ................. 73/247, 263, 264, 265, 73/266; 251/162, 163, 263, 299; 137/625.15

[56] References Cited

U.S. PATENT DOCUMENTS

| 722,390 | 3/1903 | Sprague | 73/266 |
| 2,055,710 | 9/1936 | Smith | 73/247 |
| 2,308,300 | 1/1943 | Parker | 251/163 |
| 4,150,694 | 4/1979 | Halpine | 251/163 X |

Primary Examiner—Herbert Goldstein
Attorney, Agent, or Firm—Arthur T. Fattibene

[57] ABSTRACT

For use in gas meters and the like, an improved sliding valve assembly constructed so as to be capable of self restoring the relative sliding motion between a sliding valve and its valve seat when a viscous foreign material tending to accumulate on the valving surfaces inhibits the normal motion of the valve, and thereby insuring a more accurate and reliable metering of a fluid material.

7 Claims, 5 Drawing Figures

SLIDING VALVE ASSEMBLY FOR USE IN GAS METERS OR THE LIKE

PROBLEM AND PRIOR ART

Gas meters of known constructions, e.g., as disclosed in U.S. Pat. Nos. 2,932,198 and 3,177,713, generally comprise a casing having a fluid inlet and outlet between which there is disposed a sliding valve assembly to valve the flow of a fluid to be metered through one or more measuring chambers. The respective measuring chambers have flexible wall portions operatively associated with the valve assembly to effect the drive thereof. Operatively connected to the sliding valve of the valve assembly is an indexing or registering means to record the amount of fluid flowing through the meter.

It has been observed that due to the build-up of foreign matter, e.g., dirt and/or viscous foreign matter present in the fluid or gas flowing through the meter, there often results a tendency of the valve disc to stick to the valve seat. Such sticking of the valve disc to the valve seat retards the normal sliding movement of the valve disc. When such sticking of the valve disc occurs, the reliability and/or the operation of the meter can be adversely affected.

Objects

An object of this invention is to provide an improved sliding valve assembly for use in a gas meter to enhance the operation and reliability of such gas meters.

Another object is to provide an improved sliding valve assembly which is capable of self-restoring the normal sliding movement of the valve in the event any sticking of the valve relative to its valve seat occurs within the valve assembly.

Another object is to provide an improved valve assembly for recording fluid flow which is relatively simple in construction, positive in operation and which is relatively inexpensive to fabricate.

Another object is to provide an improved valve assembly wich can be readily adapted to existing gas meters with a minimum of meter modification.

BRIEF SUMMARY OF INVENTION

The foregoing objects and other features and advantages are attained by an improved sliding valve construction which includes a self-restoring feature which operates to overcome any resistance or retarding action due to any tendency of the valve to stick to its valve seat. This is attained by movably mounting the crank pin of a sliding valve relative to the crank arm and imparting a cam action thereto so that the valve is slightly raised when a resistance is met. The crank body is therefore provided with a slot in which the crank pin connected to the valve member is movably mounted.

A transversely extending cam pin movably supports the crank pin within the slot. The cam pin is angled or inclined to impart a camming action on the crank pin and connected valve member to result in a slight lifting of the valve member so as to shear any foreign material which may tend to bind the sliding valve member. A spring is provided to normally bias the cam pin and connected crank pin toward the normal operating position. When a resistance or reaction is met which is greater than the bias of the spring, the spring is displaced which allows the crank pin to slide relative to the crank arm; and which sliding action causes the crank pin and connected valve disc to be raised slightly relative to the valve seat as to clear or shear the retarding resistance.

A feature of this invention resides in the provision of mounting a valve member on a crank pin so as to render the valve member and crank pin movable relative to the crank arm so that the valve member is sufficiently displaced so as to clear any retarding resistance acting on the valve member, without affecting the normal function of the valve member.

Other features and advantages will become more readily apparent when considered in view of the drawings and specification in which.

DETAILED DESCRIPTION

Figure 1:
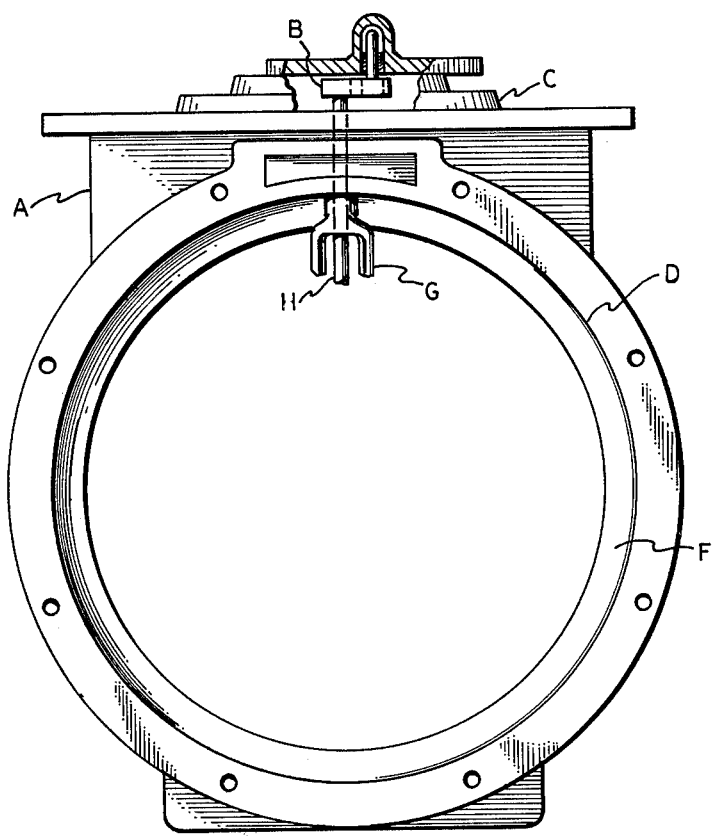
FIG. 1 is a side elevation view of a gas meter embodying the improved sliding valve construction of this invention.

Referring to the drawings, and FIG. 1 in particular, the improved valve assembly of this invention is illustrated as applied to a gas meter of a type disclosed in U.S. Pat. No. 2,032,198. Such meter comprises essentially a casing A, in which the valve assembly B is disposed within a valve housing C which is suitably supported within the casing A. Disposed within the casing A are one or more measuring chambers D which have a flexible wall portion F which is operatively connected to the valve assembly B by a connecting drive linkage G. Generally, an index registering means (not shown) is operatively connected to the valve assembly so as to provide a read-out for the amount of fluid flowing through the meter.

The instant invention is specifically directed to the valve assembly B. As best seen in FIGS. 2 to 5, the valve assembly B embodying this invention comprises a crank arm 10 which is mounted for rotation about the longitudinal axis of shaft 11. It will be understood that shaft 11 is operatively connected to a suitable drive which will impart rotation to the crank arm 10. Formed in the crank arm 10 adjacent its free end is a slot, groove or cavity 10A. In the illustrated embodiment, the groove or cavity 10A is rectangularly shaped.

Mounted for displacement within the groove or cavity 10A is a crank pin 12 which includes a base portion 12A which is received within groove 10A and an upper projecting pin portion 12B. Supported on the upper pin portion 12B is the sliding valve member or disc 13 which is slidably disposed on the upper end of the valve seat member 14. The valve seat member 14 has a plurality of port openings which are arranged in communication with the inlet and outlet of the meter housing or casing through the valve assembly. Thus, in normal operation, the sliding valve disc 13 as it is rotated valves the respective port opening in a sequential manner to control the flow of fluid through the meter.

Figure 3:
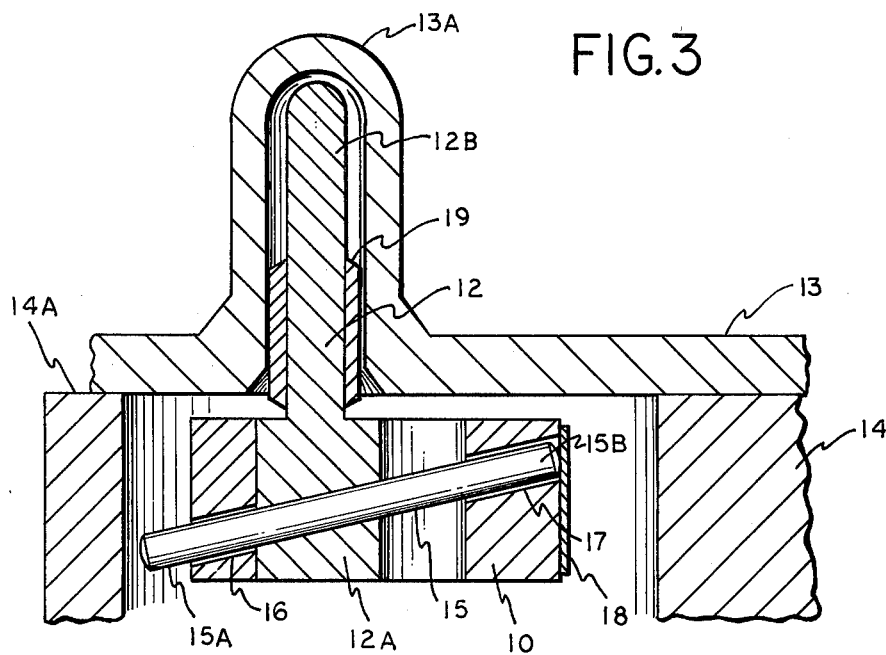
FIG. 3 is a sectional view taken along line 3—3 of FIG. 2, in which the valve member is partially shown.
Figure 5:
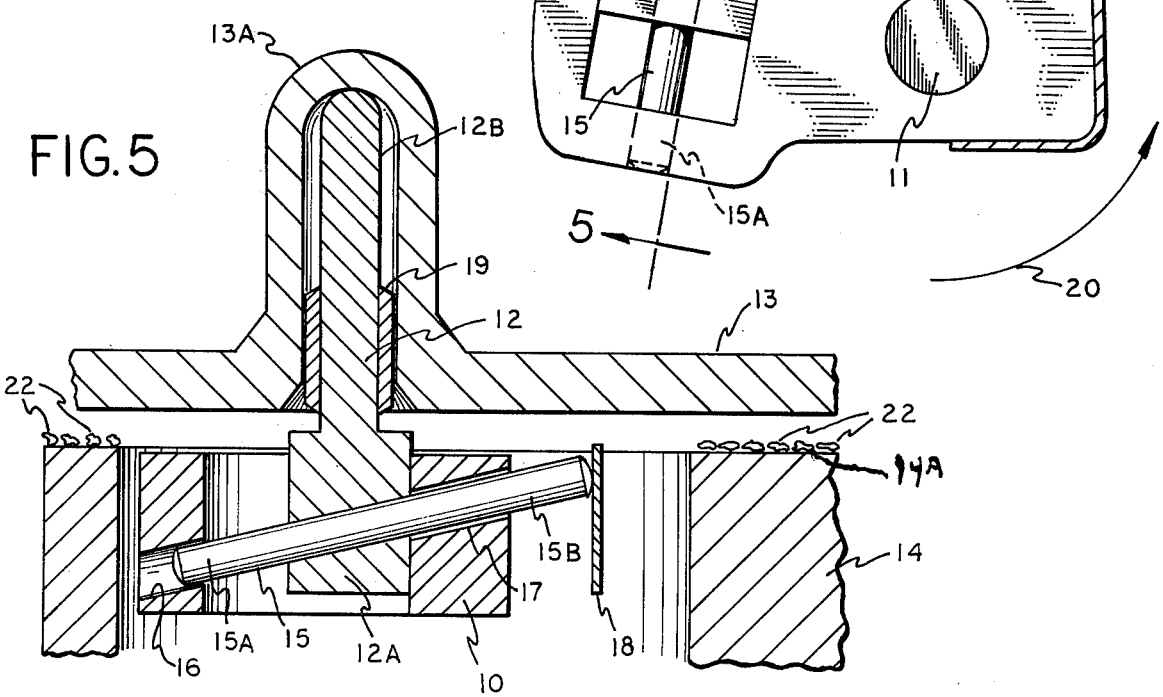
FIG. 5 is a sectional view taken along line 5—5 of FIG. 4.

In accordance with the invention, the crank pin 12 is movably mounted within groove 10A; and a camming arrangement is also provided to effect displacement of the valve disc 13 relative to the valve seat 14. In the illustrated embodiment, this is attained by extending a mounting pin 15 transversely through the base portion 12A of the crank pin 12. It will be understood that the crank pin is secured to the mounting pin 15 by any suitable means, such as a press friction fit, or secured by set screw or other keying means. As best seen in FIGS. 3 and 5, the mounting pin 15 is inclined relative to the longitudinal axis of the crank pin 12, and the end portions 15A and 15B are slidably supported in a complementary bore or hole 16 and 17 formed in the crank arm 10. It will be noted that the end 15A of the mounting pin projects beyond hole 16 in the normal position of the assembly. The other end 15B of the pin 15 is acted upon by a leaf spring 18.

As best seen in FIG. 3, the valve member or disc 13 is provided with a recessed hub 13A which receives pin portion 12A. A suitable bearing 19 is disposed about pin portion 12B. In normal operation the arrangement is such that the crank arm is caused to rotate in a direction of rotation shown by the torsional force, as indicated by arrow 20, which is transmitted from shaft 11 to the crank arm 10. In so rotating, the bias of spring 18 acting on the end 15B of the mounting pin 15 will function to normally maintain the position of the crank pin 12 relative to the crank arm 10. Thus, as the crank arm rotates in the direction of arrow 20, the crank pin 12 transmits a force through bearing 19 causing the valve disc or member 13 to slide around on the flat surface 14A of the valve seat 14, as best seen in FIG. 3.

In the event a foreign material such as dirt or sticky oil 22 present in the fluid flowing through the valve assembly is permitted to build up on the flat surface of the valve seat 14, the valve member or disc will tend to stick or retard the normal sliding action of the valve member 13 relative to the valve seat 14. Unless this sticking problem is alleviated, the accuracy and/or operation of the meter is affected.

Figure 2:
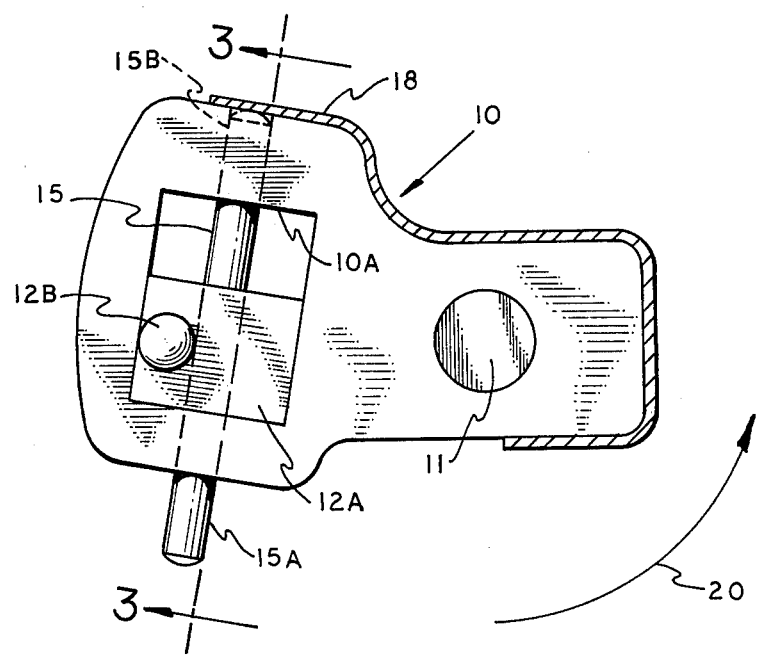
FIG. 2 is a detailed plan view of the crank arm of a sliding valve assembly embodying the invention.
Figure 4:
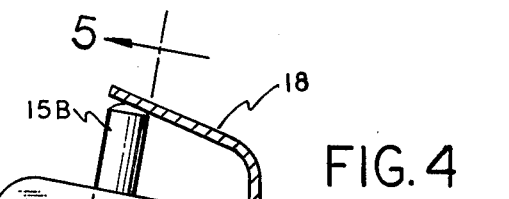
FIG. 4 is a plan view similar to FIG. 2 but showing the relative relationship of the component parts when a retarding resistance is imparted to the valve member.

In accordance with this invention, the construction is such that if and when such sticking occurs, it will create a reaction force which is transmitted from the valve disc 13 back through bearing 19 to the crank pin 12, and thence through the mounting pin 15 to the loading spring 18. If the transmitted reaction force is greater than the bias of the spring action on pin 15, the spring will be displaced, as best seen in FIG. 4, thereby allowing the crank pin 12 and connected mounting pin 15 to slide within the slot or cavity 10A relative to the crank arm 10 in a direction opposite to the normal rotation of the crank arm 10. Because the mounting pin is inclined at an angle within the cavity 10A, the connected crank pin 12 and valve member 13 carried thereon will be forced or cammed upwardly relative to the valve seat 14 as the spring 18 is displaced. Thus, the valve disc 13 is forced to rise away from the flat surface 14A of the valve seat, and thereby results in a shearing action in the viscous layer or dirt 22 so as to overcome the resistant or retarding forces which would otherwise act on the valve member 13. As the resistant or retarding forces are thus overcome, the valve disc 13 is thereby allowed to resume a normal sliding action relative to its valve seat, and in assuming its normal sliding action, the spring 18 acting on pin 15 will permit the component parts to return to their normal operating positions as shown in FIGS. 2 and 3.

While the illustrated embodiment discloses a mounting pin 15 for effecting the camming action on the crank pin to overcome any retarding resistance acting on the valve member, it will be appreciated that other camming arrangements may be provided such as complementary inclined bearing surfaces between the crank pin and the base of the cavity and/or other keying arrangement between the crank pin and the crank arm. Therefore, variations and modifications may be made without departing from the spirit or scope of the invention as shown and described.

What is claimed is:

1. A multiple chamber gas meter having a casing including a gas inlet and a gas outlet, a plurality of measuring chambers disposed within said casing, a valve means including a valve seat having a plurality of port openings communicating with said measuring chambers, a rotary mounted valve disc for sequentially valving said port openings, and a drive means for imparting relative rotary movement between said valve disc and and said valve seat, the improvement wherein said drive means comprises means for camming said valve disc in any relative rotational position of said valve disc so as to space said valve disc slightly from said valve seat in any position thereof whenever any retarding reactive force imparted to said rotating valve disc as a result of any tendency of said valve disc to stick to said valve seat in any position thereof.

2. A multiple chamber gas meter having a casing including a gas inlet and a gas outlet, a plurality of measuring chambers disposed within said casing, a valve means including a valve seat having a plurality of port openings communicating with said measuring chambers, a rotary mounted valve disc for sequentially valving said port openings, and a drive means for imparting relative movement between said valve disc and said valve seat, the improvement wherein said drive means comprises means for camming said valve disc so as to space said valve disc slightly from said valve seat to overcome any retarding reactive force imparted to said valve disc due to any tendency of said valve disc to stick to said valve seat, wherein said drive means includes a crank body having a slot formed therein, a drive for imparting rotation to said crank body, a crank pin, means for movably mounting said crank pin for movement within said slot, mounting means including a pin extending transversely of said crank pin, said mouting pin being disposed at an angle to said crank pin, means for slidably supporting said mounting pin relative to said crank body whereby said crank pin is rendered displaceable within said slot, said valve disc being connected to said crank pin, and a spring means normally biasing said mounting pin.

3. A valve assembly comprising:

a valve seat having a port opening formed therein, a rotary mounted valve means slidably mounted on said valve seat, drive means operatively connected to said valve means for effecting a relative sliding movement between said valve seat and said valve means for valving said port opening, said drive means including a camming means for overcoming any resistance tending to retard the normal relative sliding movement between said valve means and valve seat in any relative rotational position of said valve.

4. A valve assembly comprising:

a valve seat having a port opening formed therein, a valve means slidably mounted on said valve seat, drive means operatively connected to said valve means for effecting a relative sliding movement between said valve seat and said valve means for valving said port opening, said drive means including a camming means for overcoming any resistance tending to retard the normal relative sliding movement between said valve means and valve seat, wherein said valve means comprises a valve disc, and said drive means includes a crank body and a drive shaft connected to said crank body for effecting the drive of said valve disc relative to said valve seat, said crank body having a slot formed therein, a crank pin movably mounted in said slot, said valve disc being connected to said crank pin, and said camming means includes a means operatively associated with said crank pin to space said valve disc from said valve seat when a reactive force is imparted to the movement of said disc relative to said valve seat.

5. A valve assembly as defined in claim 4 wherein said last-mentioned means includes a cam pin extending transversely of said crank pin, said cam pin being inclined relative to the movement of said crank pin, and means for supporting said cam pin on said crank body to permit displacement of said crank pin and associated valve disc relative to said valve seat to overcome any retarding force imparted to said valve disc.

6. A valve assembly as defined in claim 5 and including a spring means normally biasing said cam pin toward its normal inoperative position and whereby said crank pin and associated valve disc is slightly spaced from said valve seat when the reactive retarding forces acting on said valve disc exceeds the spring bias acting on said cam pin.

7. A sliding valve assembly comprising:

a valve seat having at least one port opening therein, a valve disc slidably mounted on said valve seat for valving said port opening, a drive means for effecting the drive of said valve seat, said drive means including a crank body, a drive shaft connected to said crank body for imparting a rotational drive to said crank body, said crank body having a slot formed therein, a crank pin movably mounted relative to said crank body, said valve disc being connected to said crank pin, a cam pin extending transversely of said crank pin, said cam pin having its opposed ends slidably mounted to the ends of said slot, said cam pin being disposed so as to be inclined relative to the axis of said crank pin, and a spring means for normally biasing said cam pin toward its normal inoperative position whereby any excessive reactive force transmitted to said valve disc due to any sticking between said valve disc and valve seat will effect a displacement of said crank pin relative to said crank body so that said cam pin will cause said crank pin to space said valve disc from said valve seat to overcome said excessive reactive forces.

* * * * *